Sept. 24, 1968   H. W. DIETERT   3,402,858
VOLUMETRIC MEASURING UNIT FOR MATERIALS
Filed July 11, 1966
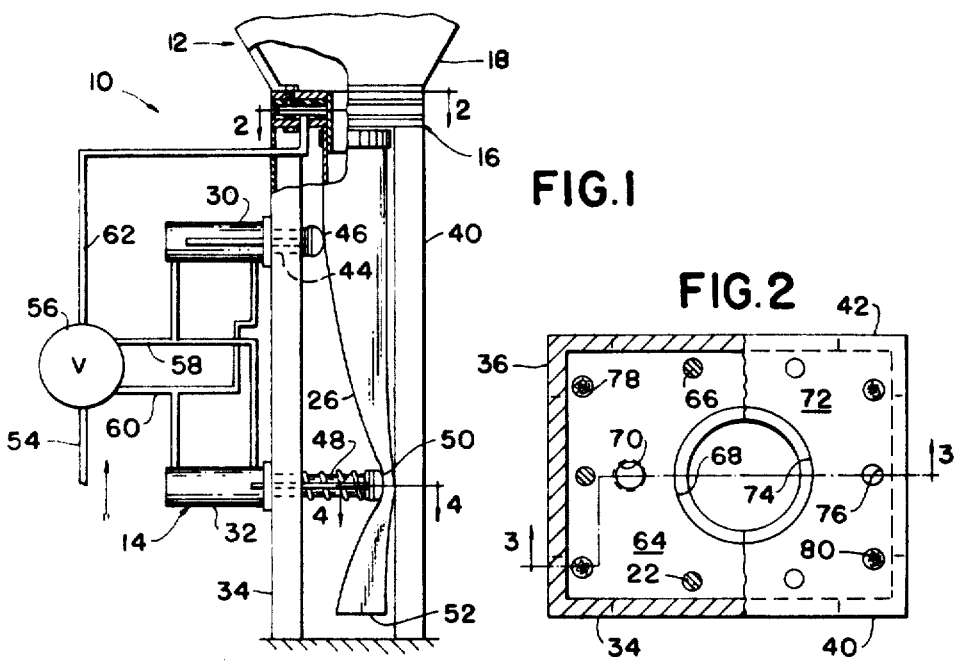
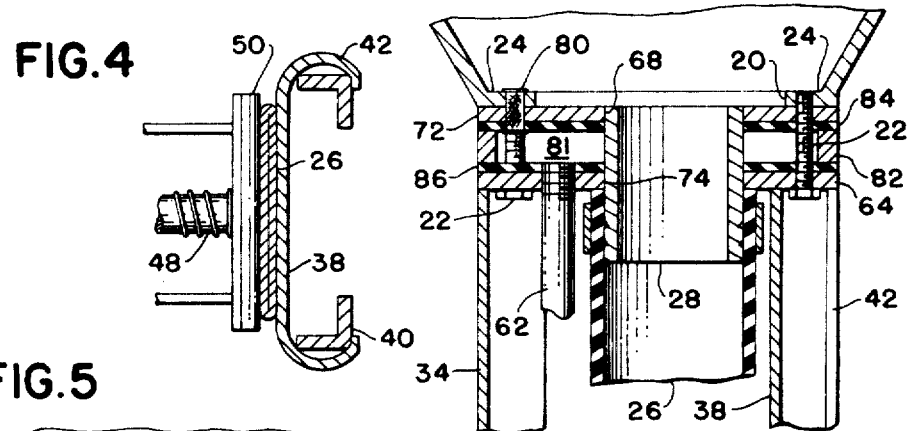
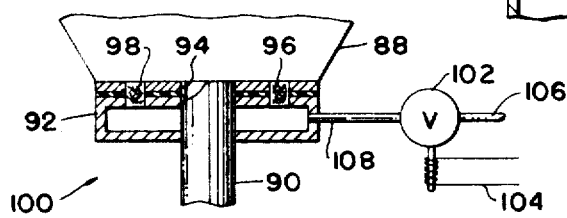
INVENTOR.
HARRY W. DIETERT
BY *Whittemore, Hulbert & Belknap*
ATTORNEYS

United States Patent Office 3,402,858
Patented Sept. 24, 1968

3,402,858
VOLUMETRIC MEASURING UNIT
FOR MATERIALS
Harry W. Dietert, Kerrville, Tex., assignor to Harry W.
Dietert Co., Detroit, Mich., a corporation of Michigan
Filed July 11, 1966, Ser. No. 564,416
3 Claims. (Cl. 222—195)

ABSTRACT OF THE DISCLOSURE

Structure for measuring predetermined quantities of powdered material or the like, including a circular discharge opening in a storage bin through which powdered material is fed by gravity, a plenum chamber surrounding the opening in the storage bin, openings between the plenum chamber and storage bin having filter material therein, means for blowing air into the plenum chamber and through the filter material under pressure to fluidize the powdered material around the discharge opening, and means for measuring a predetermined quantity of fluidized powdered material passing through the discharge opening. The means for measuring a predetermined quantity of fluidized powdered material includes a flexible but not stretchable tube for receiving the powdered material through the discharge opening and piston and cylinder structure for pinching the tube closed at predetermined locations therealong alternatively. The air passed into the plenum chamber may be exhaust air from the piston and cylinder structure.

In the treatment of granular material as for example foundry sand or the like, it is often necessary to add powdered material such as a bonding agent to the granular material to obtain required moldability thereof. It is essential to the proper conditioning of the granular material to provide an exact quantity of the powdered material for mixing with the granular material.

In the past the powdered material has usually been stored in a storage bin and measured in a volumetric measuring device after which it has been mixed with granular material in a mixer or the like. Prior volumetric measurement of the powdered material has been inaccurate due to different fluid conditions of the powdered material in the storage bin which may provide varying flow of the powdered material from the storage bin into the measuring device. Even if the powdered material flows into the measuring device uniformly, it may have a different density at different times due to the different compacting of the powdered material in the storage bin, moisture factors and the like, so that a measured volume will not provide a predetermined quantity of powdered material.

Therefore, one of the objects of the present invention is to provide improved apparatus for providing a predetermined quantity of powdered material.

Another object is to provide apparatus for providing a predetermined quantity of powdered material including apparatus for dispensing a predetermined volume of the powdered material and means for fluidizing the powdered material to insure a constant density of the powdered material dispensed.

Another object is to provide apparatus for providing a predetermined quantity of powdered material as set forth above wherein the dispensing apparatus is cycled and the fluidizing means is responsive to cycling of the dispensing apparatus.

Another object is to provide dispensing apparatus for powdered material or the like including a pliable but not stretchable dispensing tube and means for selectively and alternately pinching the tube closed at different points along the length of the tube.

Another object is to provide an improved method of providing a predetermined quantity of powdered material.

Another object is to provide a method of providing a predetermined quantity of powdered material comprising fluidizing the powdered material to provide a predetermined density therefor and dispensing a predetermined volume of the fluidized powdered material.

Another object is to provide apparatus for and a method of providing a predetermined quantity of powdered material which is simple, economical and efficient.

These and other objects will become more apparent as the description proceeds, especially when taken in conjunction with the figures of the drawing, wherein:

FIGURE 1 is a partly broken away diagrammatic representation of apparatus for providing a predetermined quantity of powdered material in accordance with the method of the invention.

FIGURE 2 is an enlarged partial section view of the apparatus illustrated in FIGURE 1 taken substantially on the line 2—2 in FIGURE 1.

FIGURE 3 is a partial section view of the apparatus illustrated in FIGURE 2 taken substantially on the line 3—3 in FIGURE 2.

FIGURE 4 is a partial section view of the apparatus illustrated in FIGURE 2 taken substantially on the line 4—4 in FIGURE 2.

FIGURE 5 is a section view of modified powdered material fluidizing structure constructed in accordance with the invention.

With particular reference to the figures of the drawing, one embodiment of the present invention will now be disclosed in detail.

As shown best in FIGURE 1, the apparatus 10 for providing a predetermined quantity of powdered material includes the storage bin 12 and dispensing structure 14. The apparatus 10 is completed by the fluidizing means 16 positioned between the storage bin 12 and the dispensing structure 14.

In operation powdered material is stored in the storage bin 12. Periodically as required a predetermined volume of powdered material is dispensed by the dispensing structure 14. To insure constant density of the powdered material dispensed by the dispensing structure 14 so that a predetermined quantity is dispensed, the powdered material in the bin 12 is fluidized by the fluidizing means 16 in response to cycling of the dispensing structure 14.

More specifically, the storage bin 12 is provided with a funnel shaped bottom portion 18 having an outlet opening 20 in the bottom thereof. The bin 12 is secured to the fluidizing means 16 by the bolts 22 passing through the flange 24 around the bottom thereof. Powdered material, such as bonding agent, for conditioning foundry sand stored in the storage bin 12 may be fed therefrom through the opening 20 by gravity.

The dispensing structure 14 includes the dispensing tube 26 secured in place on the sleeve 28 which is in communication with the opening 20 in the storage bin 12 through the fluidizing means 16. Thus, powdered material from the bin 20 will pass through the sleeve 28 and into the dispensing tube 26. The dispensing tube 26 is constructed to be pliable but non-stretchable, and for example may be rubber impregnated canvas or the like.

The dispensing structure 14 further includes the piston and cylinder structures 30 and 32 secured to the supporting legs 34 and 36 for the fluidizing means 16 and storage bin 12, and the plate 38 secured between the supporting legs 40 and 42. The piston and cylinder structure 30 includes the piston rod 44 extending therefrom having the abutment member 46 on the end thereof adapted to pinch the dispensing tube 26 closed against the plate 38 with the piston rod 44 fully extended. Similarly the piston and cylinder structure 32 includes the piston rod 48 having the abutment 50 on the end thereof for pinching the dispensing tube 26 closed at a different point along the length thereof separated from the abutment member 46.

In operation the piston and cylinder structures 30 and 32 are cycled so that one of the abutment members 46 or 50 is pinching the dispensing tube 26 closed at all times. With the abutment member 50 pinching the dispensing tube 26 closed, the tube 26 will be filled with powdered material from the bin 12 by gravity. Subsequently the abutment member 46 pinches the dispensing tube 26 closed and the abutment member 50 is retracted to allow the powdered material between the abutment members 46 and 50 in the dispensing tube 26 to flow out of the bottom 52 thereof. The abutment member 50 then causes the dispensing tube 26 to be pinched closed again and the abutment member 46 permits refilling the portion of the dispensing tube 26 between the abutment members 46 and 50 with powdered material to be dispensed subsequently.

The piston and cylinder structures 30 and 32 are actuated by air supplied from air line 54 through the valve 56. Thus, when air is passed through the conduit 58, the abutment member 46 pinches the dispensing tube 26 closed, while the abutment member 50 is withdrawn from contact with the dispensing tube 26. Similarly when air is passed through conduit 60, abutment member 46 is retracted, while abutment member 50 pinches the dispensing tube 26 closed. The exhaust air in either case from the piston and cylinder structures 30 and 32 is passed through the conduit 62 which forms part of the fluidizing means 16.

The fluidizing means 16 includes a bottom plate 64 secured to the tops of the supporting legs 34, 36, 40 and 42 having bolt holes 66 therethrough, inner annular openings 68 through which the sleeve 28 is passed, and an opening 70 to which the conduit 62 is secured for passing air through the bottom plate 64.

The top plate 72 of the fluidizing structure again includes a central annular opening 74 therethrough, through which the sleeve 28 extends and the bolt holes 76 aligned with bolt holes 66 for assembly of the top plate with the bottom plate. Additionally the top plate includes the opening 78 therein for passing air through the top plate into the powdered material within the bin 18. Filter material, such as ceramic material or steel wool 80, which is non-corrosive is positioned in the holes 78 to prevent the powdered material from the bin passing into the plenum chamber 81 between the lower plate 64 and the upper plate 72. The chamber 81 is formed by the rectangular spacing member 82 and the rubber seals 84 and 86 secured between the top plate and bottom plate by means of the bolts 22.

Thus in operation, each time the dispensing structure 14 is cycled, exhaust air from the piston and cylinder structures 30 and 32 is passed from the valve 56 through the conduit 62 into the chamber 81 and out of the chamber through the openings 78 and the filter material 80 therein to fluidize the powdered material adjacent the opening 20 in the bin 18. Thus, the powdered material passed into the sleeve 28 is of a substantially constant density. The measuring of a predetermined volume of the powdered material between the abutment members 46 and 50 in the dispensing tube 26 on actuation of the dispensing structure 14 will thus provide a predetermined quantity of powdered material as desired.

In the modified means for fluidizing powdered material illustrated in FIGURE 5, a storage bin 88 is again supported over any convenient dispensing structure 90. A plenum chamber 92 is constructed around the opening 94 in the storage bin 88 leading to the dispensing structure 90. Filters 98 are again placed in the openings 96 between the plenum chamber 92 and the storage bin 88.

In operation of the modified means 100 for fluidizing powdered material illustrated in FIGURE 5, the air valve 102 is actuated by a signal over the electrical conductors 104 as desired by an operator or in response to the dispensing apparatus 90. Air is then passed from the air line 106 through the conduit 108 into the plenum chamber 92 and through the opening 96 into the storage bin 88 to fluidize powdered material therein. The fluidizing of the powdered material in the storage bin 88 may be automatically or manually timed. Again the fluidized powdered material will be of a substantially constant density flowing into the dispensing apparatus 90 and will flow into the dispensing apparatus 90 with greater ease than unfluidized powdered material.

While one embodiment of the present invention and a modification thereof have been disclosed in detail, it will be understood that other embodiments and modifications are contemplated. It is the intention to include all embodiments and modifications of the invention as are defined by the appended claims within the scope of the invention.

What I claim as my invention is:

1. Apparatus for providing a measured quantity of powdered material comprising a storage bin for the powdered material having a discharge opening therein through which powdered material is dispensed by gravity, a plenum chamber secured to the storage bin surrounding the opening therein, a discharge sleeve secured in the discharge opening and passing through the plenum chamber, openings extending through the storage bin and plenum chamber surrounding the discharge opening in the storage bin and having filters therein; measuring means operably associated with the discharge sleeve for measuring a predetermined quantity of material passed through the discharge sleeve, including pneumatically operated piston and cylinder structure and a valve for feeding exhaust air from the piston and cylinder structure into the plenum chamber, whereby air is blown into the storage bin through the plenum chamber and filters to fluidize the material around the discharge opening in the storage bin to supply constant consistency powdered material to the discharge opening in the storage bin.

2. Apparatus as set forth in claim 1, wherein the plenum chamber comprises flat upper and lower plates having a central opening and peripheral openings therethrough, a central spacing member positioned between the upper and lower plates at the outer periphery thereof and rubber seals positioned between the upper plate and spacing member and between the spacing member and lower plate having central openings therethrough and peripheral openings therein aligned with the central opening and peripheral openings in the upper and lower plates, and bolts extending through some of the peripheral openings for securing the plenum chamber to the storage bin about the discharge opening therein.

3. Structure as set forth in claim 2, wherein the means associated with the discharge sleeve for measuring a predetermined quantity of fluidized powdered material passing therethrough comprises a flexible but non-stretchable tube connected to the sleeve, the piston and cylinder structures are positioned at spaced apart locations along said tube, and the measuring means further includes an abutment plate positioned adjacent the tube opposite the piston and cylinder structures, and means for alternately pinching the tube closed at the spaced apart locations therealong by extending the piston and cylinder structures to pinch the tube against the abutment plate.

References Cited

UNITED STATES PATENTS

| | | | |
|---|---|---|---|
| 2,167,416 | 7/1939 | Carlson | 222—195 |
| 3,305,142 | 2/1967 | Caldwell | 222—195 |
| 1,015,311 | 1/1912 | Gold | 138—123 X |
| 1,816,076 | 7/1931 | Down | 138—123 X |
| 2,797,178 | 6/1957 | Noyes et al. | |
| 3,033,420 | 5/1962 | Thomas et al. | 221—1 |
| 3,104,030 | 9/1963 | Howlett | 222—195 |
| 3,160,317 | 12/1964 | Hambro | 222—1 |
| 3,224,647 | 12/1965 | Dietert et al. | 222—193 X |
| 3,269,428 | 8/1966 | Stockel et al. | 222—195 X |

ROBERT B. REEVES, *Primary Examiner.*